United States Patent [19]

Hutta

[11] Patent Number: 4,885,019

[45] Date of Patent: Dec. 5, 1989

[54] PROCESS FOR MAKING BULK HEAVY METAL FLUORIDE GLASSES

[75] Inventor: Joseph J. Hutta, Groton, Mass.

[73] Assignee: The United States of America as represented by the Secretary of the Air Force, Washington, D.C.

[21] Appl. No.: 149,458

[22] Filed: Jan. 28, 1988

[51] Int. Cl.$^4$ .......................................... C03B 37/027
[52] U.S. Cl. .......................................... 65/3.11; 65/13; 65/DIG. 15; 65/32.5; 423/72; 423/76; 423/492; 501/30
[58] Field of Search .................. 65/3.11, 13, DIG. 15, 65/32; 423/492, 72, 76; 501/30

[56] References Cited

U.S. PATENT DOCUMENTS

| | | | |
|---|---|---|---|
| 3,233,993 | 2/1966 | Weidel | 65/32 X |
| 3,816,600 | 6/1974 | Huizing et al. | 423/489 |
| 3,871,853 | 3/1975 | Dietz et al. | 65/32 |
| 4,040,807 | 8/1977 | Midwinter et al. | 65/32 |
| 4,141,741 | 2/1979 | Lucas et al. | 116/470 |
| 4,222,760 | 9/1980 | Chyung et al. | 65/32 |
| 4,308,066 | 12/1981 | Mitachi et al. | 511/37 |
| 4,346,176 | 8/1982 | Kanamori et al. | 511/37 |
| 4,523,939 | 6/1985 | Jenkins et al. | 65/32 |
| 4,666,486 | 5/1987 | Hutta | 65/3.11 |

OTHER PUBLICATIONS

M. Matecki et al., Cadmium Halide Glasses, J. Non--Crystalline Solids, vol. 56, 1983, pp. 81-86.
P. T. Sarjeant et al., A New Approach to the Production of Glass Formation, Material Research Bulletin, vol. 3, pp. 265-281, 1968.
Mid-IR Fiber R&D Makes Progress in Several Directions, Laser Focus/Electro-Optics Symposium, Dec. 1985, pp. 98-117.
M. G. Drexhage et al., Carbon Dioxide Absorption in Heavy Metal Fluoride Glasses, 3rd International Conf. on Halide Glass, Rennes, France, Jun. 1985.
Poulain et al., "Verres Fluores Au Tetrafluorure De Zirconium Proprietes Optiques D'Un Verre Dope Au Nd$^{3+}$," Mat. Res. Bull. vol. 10, 1975, pp. 243-246.
Poulain et al., "Nouveaux Verres Fluores," Mat. Res. Bull. vol. 12, 1977, pp. 151-156.
Lucas et al., "Preparation and Optical Properties of Neodymium Fluorozirconate Glasses," Journal of Non-Crystalline Solids, vol. 27, 1978, pp. 273-283.
Lecoq et al., "Lanthanum Fluorozirconate Glasses," vol. 34, 1979, pp. 101-111.
Robinson et al., "Infrared-Transparent Glasses Derived from the Fluorides of Zirconium, Thorium, and Barium," Mat. Res. Bull., vol. 15, 1980, pp. 735-742.
Baldwin et al., "Halide Glasses," Journal of Non-Crystalline Solids, vol. 43, 1981, pp. 309-344.
Kumar, "Synthesis and Properties of Multicomponent Fluoride Glasses Containing Phosphorus and Arsenic," Mat. Res. Bull., vol. 8, 1982, pp. 1025-1034.

Primary Examiner—Robert L. Lindsay
Attorney, Agent, or Firm—Stanton E. Collier; Donald J. Singer

[57] ABSTRACT

Heavy metal fluoride glasses are made by a process that requires high purity fluoride constituent compounds fluorinated oxides, or premelted glass cullet. The charge is placed in an enclosed furnace chamber having the ability of atmosphere control, heat control and position control of the charge. In particular, an inert, or nonreactive atmosphere or air is used in the furnace chamber as well as an oxygen-scavenging metal therein. The oxygen-scavenging metal at the high temperature produces a controlled oxygen partial pressure so that the air is essentially inert and non-reactive although the presence of a slightly oxidizing atmosphere is still required to produce the glass. The charge is rapidly raised to its fusion temperature and held at the temperature for a short time in proximity to an oxygen-scavenging material. The charge is immediately removed from the heating source and quickly cooled through the critical crystallization region. The total heating and cooling time being less than one hour. The HMFG or (Zr or Hf)F$_4$ - BaF$_2$ - LaF$_3$ - AlF$_2$ consistently exhibits high optical homogeneity and no absorption due to carbon dioxide along with very reproducible hardness, thermal parameters, and UV and IR edge absorption behavior.

2 Claims, 4 Drawing Sheets

IR SPECTRA

EXPANDED VERTICAL SCALE IR SPECTRA

OXYGEN PARTIAL PRESSURE

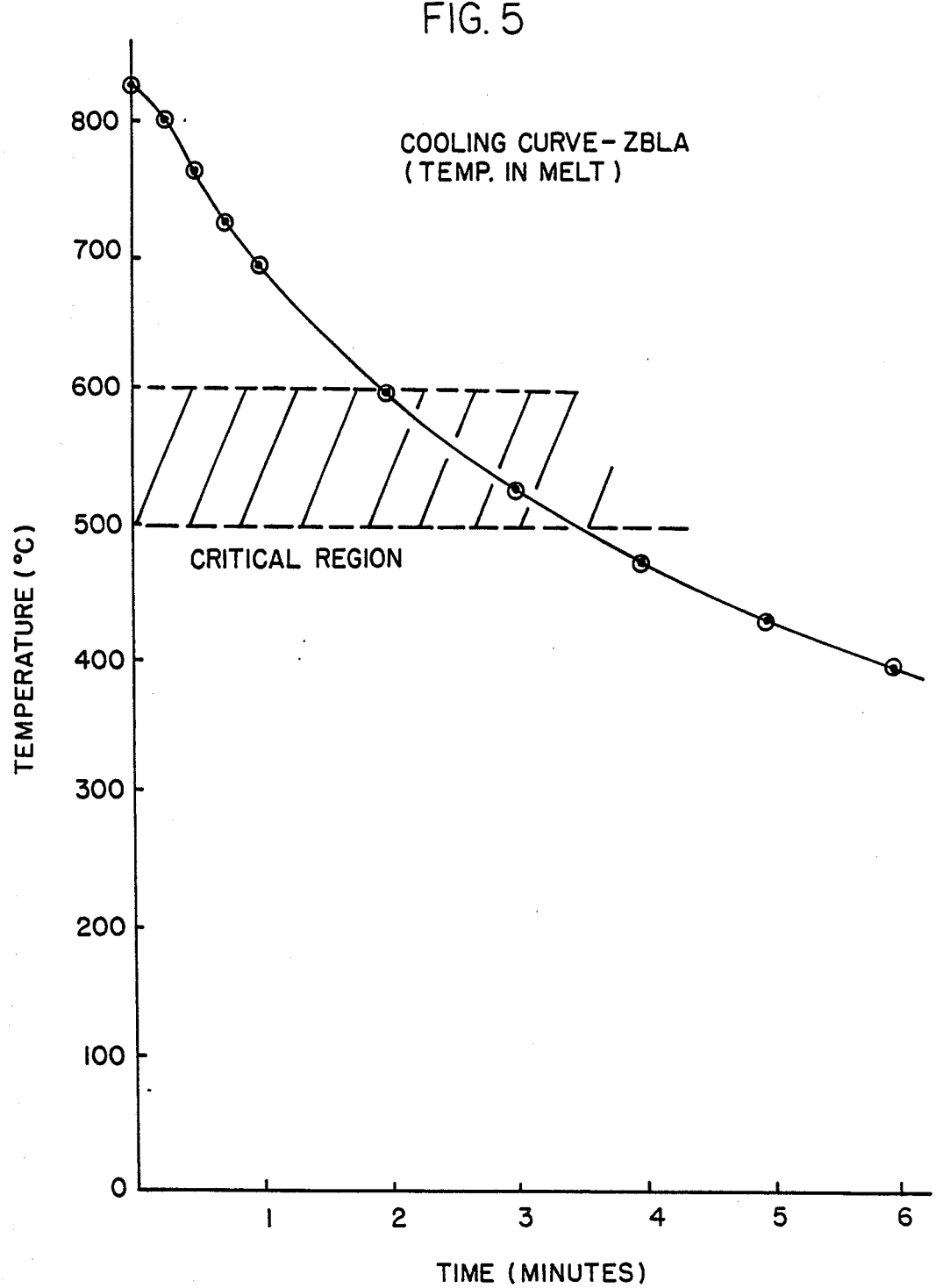

PROCESS FOR MAKING BULK HEAVY METAL FLUORIDE GLASSES

STATEMENT OF GOVERNMENT INTEREST

The invention described herein may be manufactured and used by or for the Government for governmental purposes without the payment of any royalty thereon.

BACKGROUND OF THE INVENTION

This invention relates to the preparation of glasses, and in particular, relates to the preparation of heavy metal fluoride glasses with reproducible high optical qualities.

Considerable effort has been expended to develop heavy metal fluoride glasses ("HMFG") as a viable family of infrared-transparent optical materials for application as fiber waveguides and as bulk optical components. The specific characteristics of these materials and their advantages in terms of optical performance over silica and other oxide-bases glasses are well known.

Because of fundamental physio-chemical differences, the HMFG are not as easily formed into bulk components (e.g., plates, discs, rods) as are many oxide-based glasses. For example, the viscosity (0.1-1.0 poise) of most heavy metal fluoride melts near the liquidus (800°-1000° C.) is similar to that of water. This high fluidity, coupled with the proximity of the glass-transition ($T_g \sim 320°$ C.) and crystallization temperatures ($T_g \sim 400°$) in many HMFG compositions, translates into an oftentimes marked tendency for melts to devitrify or crystallize upon cooling. In addition, the presence of specific impurities such as hydroxyl species and trace oxides may be instrumental in the nucleation and growth of crystallites.

These problems are often exacerbated by the melting techniques traditionally utilized to prepare HMFG which involve the use of oxide starting materials converted in situ to fluorides via heating with ammonium bifluoride or by the use of reactive atmospheres such as carbon tetrachloride vapor. While the conventional method represents a simple and straightforward approach to glass preparation, it has encountered difficulties in reproducing physical and optical properties from batch to batch. Moreover, such "conventionally" prepared samples often contain inclusions, crystallites, partial substitution of chlorine for fluorine or incorporation of particularly carbon dioxide, which degrades transmission near the 2350 cm $^{-1}$ wavelength region.

SUMMARY OF THE INVENTION

The present invention sets forth a process of forming heavy metal fluoride glasses that overcome the problems noted hereinabove.

The present process is directed to typical heavy metal fluoride glasses of the compositions:

[$XF_4 + BaF_2 + LaF_3 + YF$]

where X is either zirconium or hafnium and Y can represent sodium, lithium, lead, indium, or no addition.

The invention consists of melting the HMFG composition in the proximity to an oxygen-scavenging metal (fixture or device or object). Almost all of the oxygen in the melt and in the vicinity is removed by a partial pressure of the oxygen at a level ranging from approximately 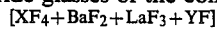 $10^{-7}$ to $10^{-40}$ atm in the 800 to 1000° C. temperature range. This feature allows the use of ordinary air in the furnace chamber.

While permitting the limited oxidizing atmosphere that is considered to be necessary for preparation of high optical quality HMFG, this low partial pressure of oxygen prevents excessive oxygen from entering the melt and degrading the optical quality of the subsequent solid (glass) product. It also eliminates or minimizes combination of oxygen with carbon furnace parts to form carbon monoxide or carbon dioxide which ordinarily dissolves in the melt and degrades the resulting glass product. As such, carbon containing components of the apparatus are replaced with non-carbon components.

In the glass preparation procedure, oxygen can be introduced from any or all of these sources:

Atmospheric gas adsorbed on the furnace chamber walls, components and on the glass forming constituents themselves.

As a contaminant in the inert gas supply utilized.

As the result of any leakage of air into the furnace chamber during operation.

The glass-component starting material, or previously-prepared glass cullet, contained in a nonreactive vessel or crucible is placed in a closed chamber wherein it is heated to fusion (melting). This closed chamber can be a covered container or jar such as one fashioned from fused silica glass. It also can be an airtight furnace chamber, a bell-jar, an airtight dry-box, a glove-box or any other enclosure or (isolation) containment chamber.

The heater can either be located within the enclosure or outside the enclosure. The heater can be of any suitable type such as inductive (r.f. or low frequency) or electrical resistance.

Cooling to the solidified glass can be done in the container by turning off the heater or by separating or isolating the heater from the container.

It also can be accomplished by removing the container from the source of heat and pouring the liquid into a mold.

It also can be accomplished by releasing the melt, from the melt-container, held in place, directly into a mold by means of a suitable valve, removable plug or puncturing device.

The mixture of fluorides in either powdered, lump or crystal form or as premelted glassy cullet is contained in a vitreous carbon or noble metal (crucible) vessel, preferably.

The process for forming the glass is as follows:

The loaded vessel is placed in the airtight furnace (chamber) enclosure. The furnace chamber is then filled with an inert, nonreactive gas or air. The chamber is not evacuated and backfilled with argon as previously done. The temperature of the furnace is raised beyond the melting point of the mixture in proximity to an oxygen-scavenging object such as zirconium, titanium, manganese or iron foil, wire or sheet. The resulting melt is then quickly cooled by disengagement from the heat source and removed. The resulting clear glass ingot is then annealed for about three hours at 280° C. and then slowly cooled.

The heating sequence is as follows: (1) Rapidly heating the mixture to complete melting and clearing at a temperature of about 850° C., in an inert, nonreactive gas or air atmosphere in proximity to an oxygen-scavenging material; (2) holding it at that point for a short period before removing the melt and pouring it into a mold or turning off the furnace power resulting in the abrupt removal of the heat source, and withdrawing the crucible support a short distance. This allows the glass to form in situ, and permits partial annealing.

It is therefore one object of the present invention to provide a process of making bulk heavy metal fluoride glass (HMFG) articles.

It is another object of the present invention to provide a process of making HMFG of high optical quality in bulk.

It is another object of the present invention to provide a process of making HMFGs having highly reproducible optical and physical characteristics.

It is another object of the present invention to provide a process of making glass having a minimum amount of carbon dioxide and/or chlorine therein.

It is another object of the present invention to provide an atmosphere of controlled low oxygen content in the chamber while making the HMFG.

It is another object of the present invention to provide a process that uses an oxygen-scavenging material to substantially lower carbon dioxide in the HMFG.

It is another object of the present invention to minimize carbon contamination by using non-carbon components within the furnace.

These and many other objects and advantages of the present invention will be readily apparent to one skilled in the pertinent art from the following detailed description of a specific embodiment of the invention and the related drawings.

BRIEF DESCRIPTION OF THE DRAWINGS

FIG. 5 is a cooling-rate diagram.

DETAILED DESCRIPTION OF A PREFERRED EMBODIMENT

The present invention is a process of providing stable, highly reproducible, high optical quality heavy metal fluoride glasses that lack devitrification, straie, seed, internal bubbles, crystalline inclusions, dissolved $CO_2$ and chlorine contamination or other defects and inhomogeneities common in glasses of this type.

Figure 1A:
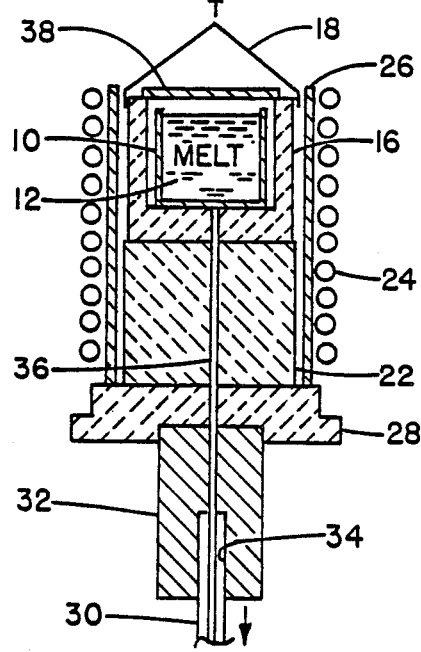
FIGS. 1 A and 1B are partial diagrammatic view of the functional parts of an internally heated RF induction furnace of the present invention

Referring to FIG. 1A, the chemical constituents in powder, lump or crystal form or cullet fragments of the heavy metal fluoride glass (HMFG) composition are placed in a crucible 10 to form a charge 12. Crucible 10 may be made of a noble metal or carbon. Crucible 10 is placed in container 16 that is shaped like a cup and made of carbon, for example. Although container 16 is used as a heat susceptor, the process does not require its use. Container 16 is connected by means of hanger 18 to a vertically movable means, not shown. Container 16 rests upon a support cylinder 22 that may also be carbon. Container 16 is surrounded by a cylinder 26 fashioned from an oxygen-scavenging metal, such as zirconium or copper. Other possible oxygen-scavenging metals are shown in FIG. 5 along with the oxygen partial-pressure created as a result. It is also possible to use the crucible 10 alone with hanger 18 attached thereto and partially or completely covered by a lid 38 made of the selected oxygen-scavenging metal. Cylinder 26 and support cylinder 22 rest upon graphite pedestal 28. A lower retractor shaft 30 is connected to a support 32 that holds pedestal 28. A hole 34 through shaft 30, support 32, pedestal 28, and cylinder 22 allows a thermocouple 36 therein to be held in close contact with crucible 10. The above items are placed within a closed furnace chamber.

The important features of the above apparatus are the ability to quickly remove crucible 10 from the source of heat such as coil 24 and cylinder 22, being able to immediately cool melt charge 12 by instantaneous termination of electric power to induction coil 24, and being able to adjust the separation between crucible 10 and support cylinder 22 that acts like a diminishing heat source after heating induction coil 24 is turned off. Induction coil 24 is made of copper tubing and kept from melting by a constant flow of chilled 40° F. water. This flow continues after power shutoff but is not necessary to the glass formation process.

Another feature is the melting of the HMFG charge 12 in proximity to an oxygen-scavenging metal object (device) such as lid 38 and/or cylinder 26 in order to remove most of the oxygen in the melt vicinity and maintaining the partial pressure of said oxygen at a level ranging from approximately $10^{-7}$ to $10^{-40}$ atm in the 800° C. to 1000° C. temperature range.

This key feature prevents excessive oxygen from entering the melt and degrading the optical quality of the subsequent solid (glass) product. It also eliminates or minimizes the combination of oxygen with carbon furnace parts to form carbon monoxide or carbon dioxide which ordinarily dissolves in the melt and degrades the resulting glass product. It further avoids entirely the widely-used carbon tetrachloride reactive atmosphere processing (RAP) approach responsible for carbon dioxide contamination of fluoride glasses. In the glass preparation procedure of the present invention oxygen can be introduced from any or all of these sources.

Atmospheric gas adsorbed on the furnace chamber walls, components and on the glass-forming constituents, themselves.

As the result of any leakage of air into the furnace,

As a natural constituent when air is employed as the furnace atmosphere in the chamber during operation.

Leakage of air into the chamber during operation.

Figure 1B:
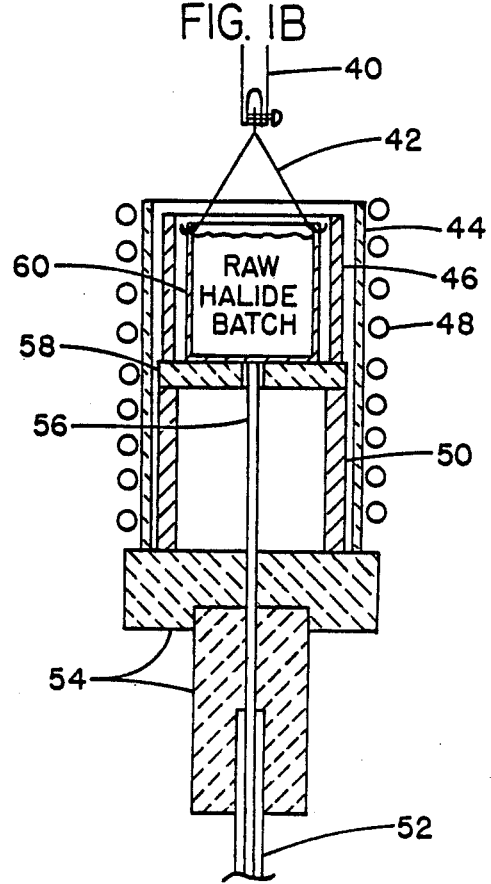

In order to further reduce the presences of carbon within the furnace, non-carbon components are used therein. FIG. 1B discloses a crucible 60 made of a noble metal, platinum or platinum alloy attached to a hanger 42 of the same hung from an upper retractor chuck 40. About crucible 60 is a susceptor 46 made of copper, brass or steel, for example. A silica cylinder 44 protects induction coil 24 from accidental contact. Crucible 60 rests upon a plate 58 of alumina and this rests upon a support cylinder 50 of steel. Support 54 is made of boron nitride having a lower retractor shaft 52 with a thermocouple 56 therein.

The glasses were of composition (mole percent) 57 $XF_4$–36$BaF_2$–3 $LaF_3$–4$AlF_3$ where X=either Zr or Hf, the former are denoted by the acronym "ZBLA", while the latter are referred to as "HBLA". While the process described is applicable to a variety of HMFG compositions, these particular glasses were chosen because they have been extensively characterized and are relatively stable.

These compositions are only one of a number of compositions in the glass-forming region of the zirconium/- hafnium-barium-lanthanum-aluminum fluoride systems. Moreover, aluminum represents an additive to the Zr/Hf-Ba-La fluoride systems, in which it is possible to form glass without its presence.

This process is not limited to the ZBLA/HBLA fluoride compositions given above, but can be applied to all other fluoride glasses, and even chloride glasses, with only slight modification of procedure. A list of these fluoride glasses is shown in Table 1 but this is still not all-inclusive.

In making up a batch composition from the components, either the anhydrous fluorides or the oxides or mixtures of the two can be used. Where oxides are present, the mixture must be given a fluorination treatment. This can be done by introducing an atmosphere of fluorine-containing vapor. This can be HF gas or addition of ammonium bifluoride ($NH_4HF_2$). The need for fluorination can be obviated by using the anhydrous fluorides as starting material. This is the preferred approach, although the use of oxides or mixed oxides/-fluorides is less expensive and may be preferred for commercial production.

TABLE 1

| Composition | Approximate mol, |
|---|---|
| HZBT | 29-29-33-9 |
| HBT | 58-33-9 |
| HBL | 60-35-5 |
| HBLC | 62-23-5-10 |
| HBLR | 56-22-7-15 |
| HBLP | 62-15-5-18 |
| HBPC | 62-15-15-8 |
| HBLAPC | 62-15-5-2-10-6 |
| HBTKLRC | 53-22-8-4.2-4.2-4.2-4.2 |
| HBTLNRC | 53-22-8-4.2-4.2-4.2-4.2 |
| HBLA | 57-36-3-4 |
| ZBT | 58-33-9 |
| ZBL | 62-33-5 |
| ZBTKLRC | 53-22-8-4.2-4.2-4.2-4.2 |
| ZBLA | 57-36-3-4 |
| ZBLC | 60-23-7-10 |
| ZBLAN | 56-14-6-4-20 |
| ZBLANI | 56-14-6-4-15-5 |
| ZBLALi | 53-19-5-3-20 |
| ZBLALiP | 51-16-5-3-20-5 |
| BZnYT | 17.5-30-26.5-26 |
| BZnYAT | 15-27-27-4-27 |
| BZnYAT | 20-29-14.4-14.4-22.2 |
| BYAT | 20-29-29-22 |
| BZnYT | 20-26.7-26.7-26.7 |
| BZnLTG | 19-25-25-25-6 |
| BZnYTN | 14-27-27-27-5 |
| CLiAP | 28-5-28-38 |
| BGZ | 33-4-63 |
| BGZA | 32-4-60-4 |

H - Hafnium P - Lead
Z - Zirconium A - Aluminum
B - Barium N - Sodium
T - Thorium Y - Ytterbium
L - Lanthanum K - Potassium
C - Cesium G - Gadolinium
R - Rubidium I - Indium
Zn - Zinc Li - Lithium The constituent chemicals or glass cullets fragments were loaded into a vitreous carbon or platinum crucible 10. Crucible 10 was then placed into an airtight furnace chamber which consists of a water cooled stainless steel vessel with multiple view and access ports.

The furnace may be operated under vacuum or pressure and can accommodate almost any type of inert or reactive or nonreactive atmosphere.

The furnace may be filled with argon or helium to just over atmospheric pressure and sealed off or left under a slow flow of the inert gas at slight positive pressure. Other atmospheres such as air, nitrogen, freon, $NF_3$, $PF_5$ and $SF_6$ are also possible.

The criterion for selecting an atmosphere for the furnace is that it should be substantially inert and minimally interactive with the glass melt being prepared therein. The use of a reactive atmosphere of carbon tetrachloride gas has in the past created many problems that have now been eliminated with the use of an controlled low partial pressure inert oxygen, nonreactive atmosphere.

In this embodiment, the sealed furnace chamber was evacuated to about 110 torr by means of a standard laboratory mechanical vacuum pump. Evacuation was then terminated and the furnace chamber was backfilled with a charge of ordinary room-air drawn through a cylinder packed with a commercial desiccant (DRIERITE) and through concentrated sulfuric acid ($H_2SO_4$), connected in tandem, for the purpose of removing any water ($H_2O$) that might be present.

The heating procedure consisted of gradually but rapidly raising the temperature of the glass composition to complete melting and homogenization at about 850° C., holding at that temperature for about 5 minutes, then rapidly cooling the molten mixture by turning off the furnace power or removing the melt from the source of heat. A high cooling rate is desirable. In the present embodiment, cooling rates of around 65° C. per minute on cooling through the 600° to 500° C. temperature region are effective in producing high quality glass. See FIG. 5, for example. Rates as high as 81° per minute and as low as 61° per minute have produced high quality glass. In practice, the 600° to 500° C. temperature region appears to be critical with regard to the onset of crystallization and it must be traversed as quickly as possible as an additional factor in producing high optical quality HMFG glass. The above applies, in particular, to ZBLA, HBLA and ZBLAN. The cooling rates and critical temperatures may be somewhat different for other HMFG compositions. The resulting clear glass ingot is removed from the crucible or mold; the ingot is subsequently annealed for three hours at 280° C. near the glass transition point, Tg, and then cooled to room temperature at a rate of 0.3° C./min.

The glass specimens prepared were 3.5 cm in diameter with thicknesses up to 2.0 cm before grinding and polishing. Bubbles at the melt/crucible interface were confined to the surface of the samples and do not extend to the interior. All specimens were water-white, striae-free, and appear to have an excellent optical homogeneity.

In view of the applications envisioned for HMFG, their optical behavior in the 1-8 micron region of the spectrum is of particular significance. Previous experience with ZBLA-type compositions prepared by different preparation methods had indicated considerable variation in sample quality, size, and mid-infrared optical properties such as $CO_2$, OH, and oxide absorption bands. Specimens prepared by the present invention appear to have circumvented many of these problems and show a high degree of uniformity in their mid-IR optical characteristics.

Figure 2:
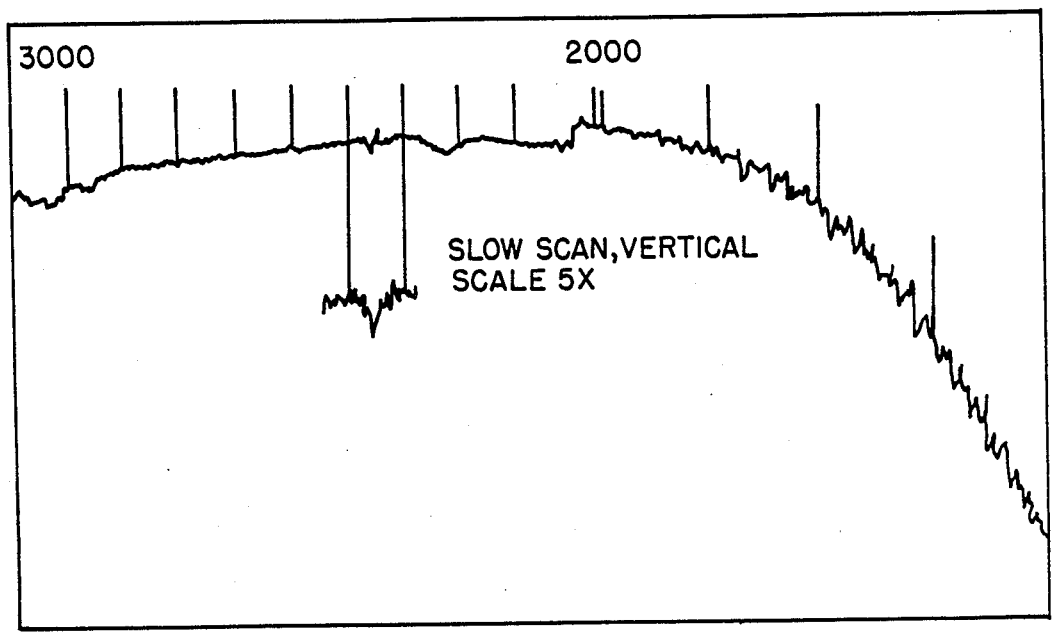
FIG. 2 is a graph of percent transmission versus wavelength of a sample glas.
Figure 3:
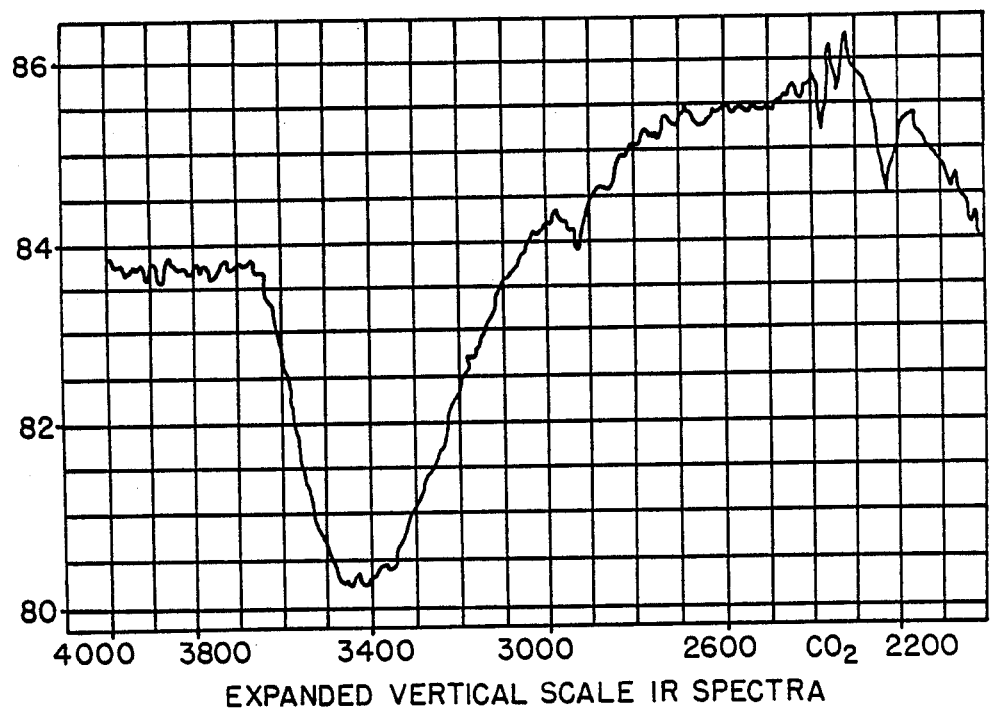
FIG. 3 is a graph of expanded percent transmission versus wavelength of the sample glass.
Figure 4:
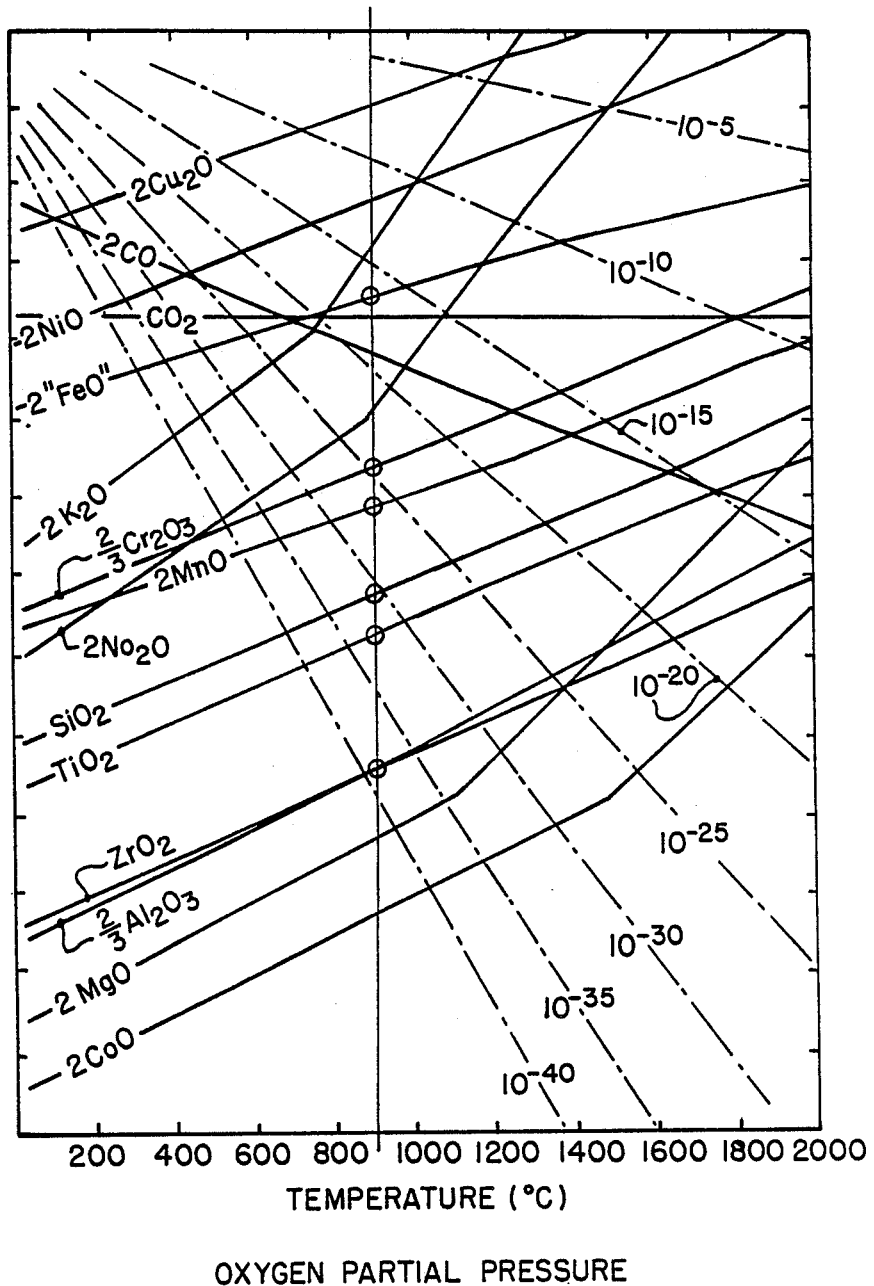
FIG. 4 illustrates oxygen pressure using different metals at different temperatures.

As a further demonstration of the superior optical quality of heavy metal fluoride glass specimens made in this invention, a transmission curve for specimen ZBLA 11/30-84 is shown in FIGS. 2 and 3.

In addition to its wide range in transparency from the near-UV to the mid-IR (from 0.3 to about 5.5 microns), this specimen, in contrast to heavy metal fluoride glasses made by conventional and carbon tetrachloride reactive atmosphere processing techniques, shows no absorption (over background) at 2350 cm$^{-1}$ wavelength due to $CO_2$ nor does it display a 'shoulder' on its infrared edge. Nonvisibility of a He-Ne laser beam propagated through this specimen further attests to its superior optical quality, total homogeneity and absence of scattering sites.

Through a configuration of furnace components designed to provide a uniform thermal environment in the glass melt containment vessel and control of the oxygen partial pressure in the system as well as a rate of cooling that precludes crystallization, it is possible to reproducibly fabricate relatively large pieces of fluorozirconate and fluorohafnate glasses. Glass ingots of 3.5 cm diameter and thicknesses of up to 2.0 cm with excellent optical homogeneity were formed in situ using this approach. Examination of optical and physical properties indicated that the specimens exhibited uniform and reproducible thermal parameters, UV and IR absorption edges, hardness, and a low bulk OH content. At wavelength of 0.488 microns, the light scattering in samples prepared by the method was considerably less than that observed in fused silica.

Clearly, many modifications and variations of the present invention are possible in light of the above teachings and it is therefore understood, that within the inventive scope of the inventive concept, the invention may be practiced otherwise than specifically claimed.

What is claimed is:

1. A process of manufacturing a bulk heavy metal fluoride glass having minimal carbon dioxide therein, said process comprising the steps of:

obtaining constituent fluoride compounds of said heavy metal fluoride glass in as pure a form as possible:

weighing each of said compounds to obtain a desired composition of said heavy metal fluoride glass;

mixing said compounds together to form said desired composition;

forming a charge of said composition;

loading a crucible with said charge;

placing said crucible in a furnace enclosure;

placing a material having high oxygen affinity in proximity to the crucible;

sealing said furnace;

filling said furnace with air;

quickly raising a temperature of said charge above said fusion temperature to insure admixture of molten constitutent compounds of said charge;

reducing the partial pressure of oxygen in said furnace at a level ranging from approximatey $10^{-7}$ to $10^{-40}$ atmospheres in the 800° C. to 1000° C. temperature range to minimize carbon dioxide contamination of said charge;

holding said charge at this higher temperature within said range for a short period of time, said charge reaching said higher temperature in less than two hours from the start of said heating; and lowering a temperature of said charge in a short period of time to a temperature less than said fusion temperature, said charge forming a bulk glass.

2. A process of manufacturing bulk heavy metal fluoride glass as defined in claim 1 including the step of selecting said material from a group consisting of copper, zirconium, titanium, manganese, and iron.

* * * * *